N. A. PETRY.
MUFFLER CUT-OUT.
APPLICATION FILED APR. 10, 1917.

1,339,284.

Patented May 4, 1920.
6 SHEETS—SHEET 1.

Inventor-
Nicholas A. Petry
by his Attorneys
Howson & Howson

N. A. PETRY.
MUFFLER CUT-OUT.
APPLICATION FILED APR. 10, 1917.

1,339,284.

Patented May 4, 1920.
6 SHEETS—SHEET 2.

Inventor—
Nicholas A. Petry.
by his Attorneys-
Howson & Howson

N. A. PETRY.
MUFFLER CUT-OUT.
APPLICATION FILED APR. 10, 1917.

1,339,284.

Patented May 4, 1920.
6 SHEETS—SHEET 3.

Inventor—
Nicholas A. Petry.
by his Attorneys—
Howson & Howson

N. A. PETRY.
MUFFLER CUT-OUT.
APPLICATION FILED APR. 10, 1917.

1,339,284.

Patented May 4, 1920.
6 SHEETS—SHEET 5.

Inventor—
Nicholas A. Petry.
by his Attorneys
Howson Howson

N. A. PETRY.
MUFFLER CUT-OUT.
APPLICATION FILED APR. 10, 1917.

1,339,284.

Patented May 4, 1920.
6 SHEETS—SHEET 6.

Inventor—
Nicholas A. Petry.
by his Attorneys—
Howson & Howson

UNITED STATES PATENT OFFICE.

NICHOLAS A. PETRY, OF PHILADELPHIA, PENNSYLVANIA.

MUFFLER CUT-OUT.

1,339,284.   Specification of Letters Patent.   Patented May 4, 1920.

Application filed April 10, 1917. Serial No. 161,009.

*To all whom it may concern:*

Be it known that I, NICHOLAS A. PETRY, a citizen of the United States, residing in Philadelphia, Pennsylvania, have invented Muffler Cut-Outs, of which the following is a specification.

My invention consists of certain improvements in the muffler cut-out shown in my U. S. Letters Patent No. 1,215,185, of February 6, 1917, and in operating mechanism for such a cut-out.

My patented device shows means whereby the exhaust gases from the engine of an automobile may be directed either to the muffler or diverted through a cut-out to the open air. In many modern cars, however, it is desired that the exhaust gases be utilized for various purposes such as to heat the body of the car, to heat the water in the cooling system to prevent freezing, to heat the fuel before it goes to the motor, to blow a horn or whistle, or to perform other work, and one object of my present invention is to so construct a muffler cut-out that the exhaust gases may at will be caused to pass through it to the muffler, may be diverted to the cut-out, or may be diverted elsewhere by it for the performance of any desired work.

While for convenience, I shall refer to this supplementary diversion of the exhaust gases as being to a "heater", it is to be understood that the actual device in or by which they are utilized is immaterial.

Another object of my invention is to so construct the operating mechanism of my cut-out that it may be quickly and positively moved to any of its positions by means of a treadle, the connection between the treadle or other actuating member and the cut-out valve element being likewise of novel construction.

A still further object is to provide adjusting means for the operating mechanism whereby any variance in the length or position of the operating rod or chain or difference in the line of thrust of the rod may be compensated for.

I also desire to provide a novel form of multiport valve which shall include a movable member of simple and substantial form so designed that while certain of its ports open in one plane, at least one other opens in a line extending at an angle to said plane.

These objects and other advantageous ends I secure as hereinafter set forth, reference being had to the accompanying drawings, in which.

Fig. 8 is a view similar to Fig. 4, showing the invention as adapted to simultaneously divert the exhaust gases to two heaters;

Fig. 9 is a view similar to Fig. 5, but showing the valve member employed in the construction shown in Fig. 8;

Fig. 9$^a$ is a perspective illustrating the modified form of the valve member;

Fig. 11 is a view similar to Fig. 10, but showing the preferred form of my operating device;

Fig. 11$^a$ is an enlarged vertical section on the line 11$^a$—11$^a$, Fig. 11;

Fig. 12 is an enlarged vertical section on the line 12—12, Fig. 10;

Referring to Figs. 1 to 7, inclusive, 5 represents a casing having side walls 2 and 3 defining a valve chamber. In communication with this valve chamber are an inlet port 6 through which exhaust gases from the engine enter, an exhaust port 7 through which gases may pass to the muffler, and a cut-out exhaust port 8 all arranged to open peripherally into the casing. In addition there is a supplementary exhaust port 9 opening into the casing through the side 2, through which gases may pass to the heater.

Figure 1:
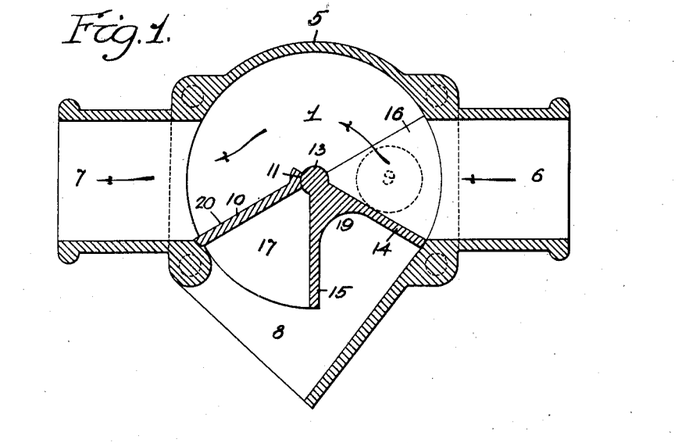
Figure 1 is a vertical longitudinal section through a muffler cut-out constructed in accordance with my invention, the valve member being in position to direct exhaust gases from the engine to the muffler.
Figure 2:
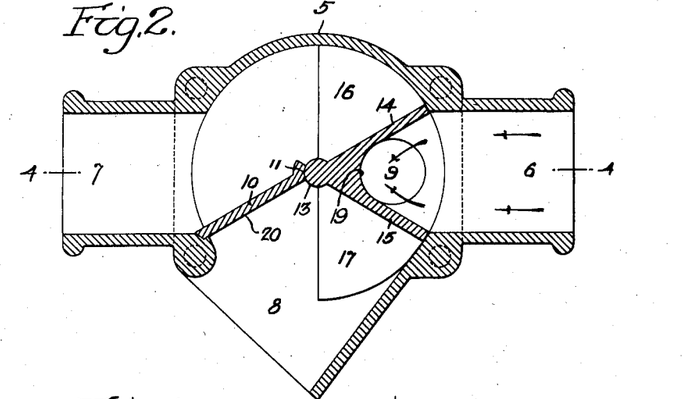
Figs. 2 and 3 are similar views showing the valve member in position to divert the gases to the heater and to the cut-out respectively.
Figure 3:
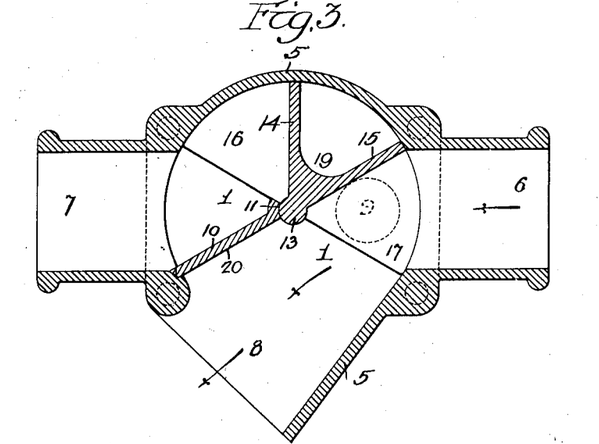
Figures 5, 6, 7:
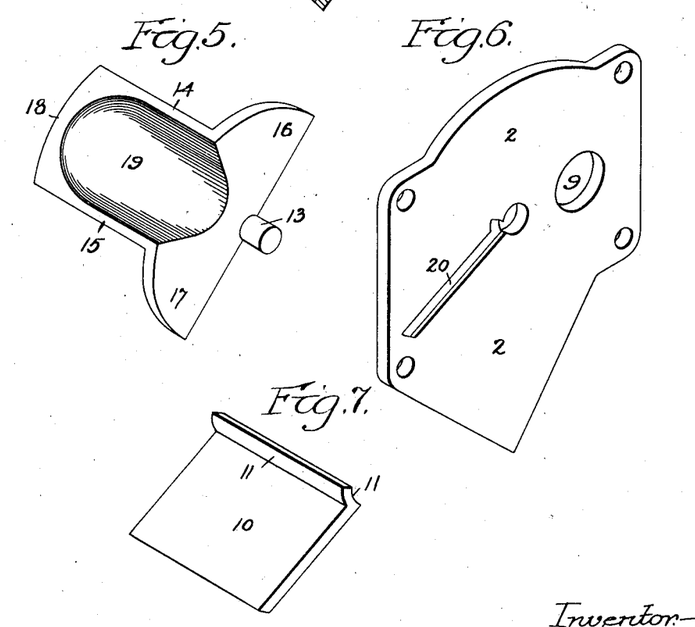
Fig. 5 is a perspective view of the valve member of the cut-out.
Figs. 6 and 7 are perspective views of a side plate and of the partition respectively, forming part of the valve casing.

Projecting radially into the valve chamber 1 which is cylindrical in form is a partition 10 having its inner edge made concave to provide a seat 11 for a valve stem 13, which fits bearings in the opposite side plates 2 and 3. Projecting from said stem 13 are transverse or radial wings 14 and 15 and lateral wings 16, 17 and 18. The wings 14, 15 and 18 combine to form a pocket 19 which is open at one side and on its outer face.

Figure 4:
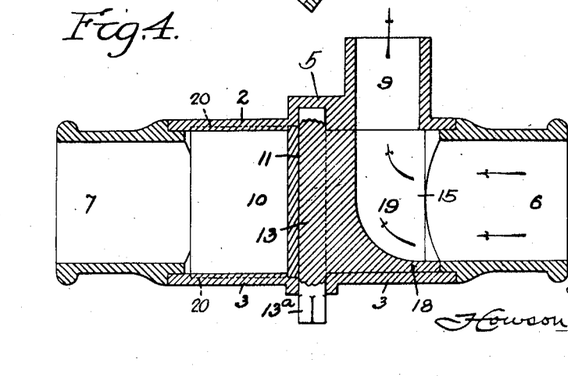
Fig. 4 is a transverse section on the line 4—4, Fig. 2.

When the valve member is in the position shown in Fig. 1, the wing 16 serves to close the heater exhaust port 9 and the wing 14 closes the cut-out exhaust port 8. The exhaust gases then entering the port 6 flow past the wing 16, over the wing 14, over the partition 10, and out through the port 7 to the muffler. When the valve member is adjusted to the position shown in Fig. 2, the wing 14 blocks off the major portion of the chamber 1, the wing 18 closes the cut-out exhaust port 8, and the open end of the pocket 19 of the valve member is in line with the heater exhaust port 9. The exhaust gases entering the port 6, therefore flows through the pocket 19 and out through the port 9 to the heater, as best shown in Fig. 4. When the valve member is adjusted to the position shown in Fig. 3, the wing 17 closes the heater exhaust port 9, the wing 15 blocks off the major portion of the valve chamber 1, and the exhaust gases entering the port 6 flow past the wing 17, under the wing 15, under the partition 10, and out through the cut-out exhaust port 8.

To facilitate and lessen the cost of manufacture of this muffler cut-out I preferably construct it with the conduits constituting the ports 6 and 7 formed integrally with the casing 5, which casing also includes the bottom wall of the cut-out exhaust port 8. The sides of the valve chamber 1 and of the cut-out exhaust port 8 are formed by the side plates 2 and 3 which are removably attached to the casing 5. Formed within the inner face of each side plate is a groove 20 for the reception of an edge of the partition 10, as shown in Fig. 6.

When assembling a muffler cut-out constructed in accordance with this invention I first attach the plate 2 to the casing 5, next I place the partition 10 in position with its edge in the groove 20 formed in said plate 2, I then insert the valve member with its stem 13 against the seat 11 and one end thereof projecting through the bearing formed in the plate 2, and finally I attach the plate 3 with the edge of the partition 10 in the groove 20 formed in said plate, with the valve stem 13 projecting through the bearing also formed therein.

By making the parts in this way I have been enabled to materially decrease the cost of manufacture by reducing and simplifying the number of operations necessary.

If desired, however, one of the side plates may be made integral with the main casing as would be preferable with cut-outs of large size, where greater strength is required than when both side plates are detachable.

Figures 8, 9, 9A:
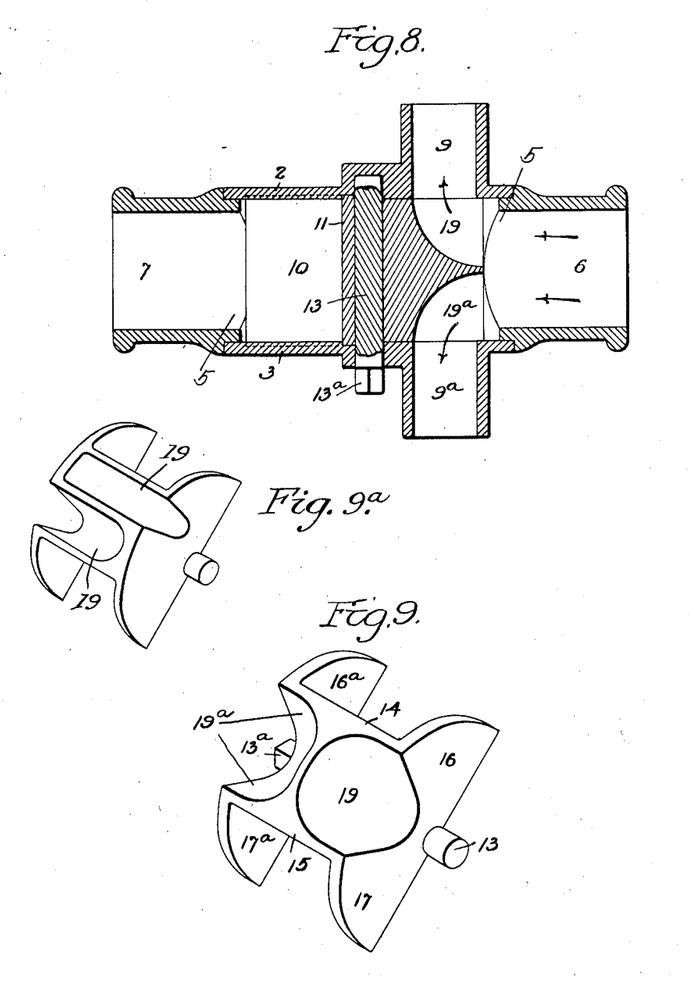

In some cases the exhaust gases may be diverted to two heaters or to a heater and a whistle or horn, and to accomplish this I use the construction shown in Figs. 8 and 9. In Fig. 8, I show in addition to the supplementary exhaust port 9 formed in the side plate 2 a second exhaust port $9^a$ formed in the plate 3. The valve member, as shown in Fig. 9, is provided with supplementary lateral wings $16^a$ and $17^a$ for coöperation with the exhaust port $9^a$, and between the transverse wings 14 and 15 are formed two cavities or pockets 19 and $19^a$, of which the former coöperates with the port 9 and the latter with the port $9^a$. Exhaust gases entering the port 6 are therefore evenly divided and diverted to the ports 9 and $9^a$, as shown in Fig. 8.

Should it be desired to divert the entire flow of exhaust gases to either the port 9 or the port $9^a$, independently of the other, I make my valve member capable of occupying any one of four positions instead of three positions, and provide it with two pockets or cavities 19, one opening to the right and the other to the left, (Fig. $9^a$) one to divert the gases to the port 9 and the other to divert the gases to the port $9^a$, according to which pocket is brought into line with the inlet port 6.

For operating the valve member by means of a push rod 21 (Figs. 10 and 12), I form on the projecting end of the valve stem 13 a squared head $13^a$ and upon this mount a spur pinion or other suitable toothed structure 22. This pinion meshes with a second toothed structure in the form of a segment 23 pivoted to the outer face of the plate 3, and having attached to it one end of a coiled spring 24. The other end of this spring is tightly wrapped about or otherwise secured to a screw stem 25 which passes through a projecting lug 26 formed integral with or otherwise rigidly mounted upon the casing 5 and is engaged by a nut 27 whereby the tension of said spring may be adjusted at will.

In order to prevent accidental loosening of the nut 27, I form in its inner face notches which receive projections 28 formed upon the outer face of the lug 26, and serve to lock the nut so as to effectually prevent any loosening thereof. By making the inner faces of the notches as shown, at a wider angle than the outer faces of the lugs and employing two of each at diametrically opposite points, with the opening through the lug 26 of greater diameter than that of the screw stem 25, I also provide a pivotal mounting for the nut upon which it may rock as the line of pull upon the screw stem 25 changes with the movement of the segment 23 from one position to another.

The spur pinion or toothed structure 22 extends considerably beyond the outer face of the segment 23 and upon this extended portion I mount a cap 29 which is internally toothed for engagement with the teeth of said pinion. Projecting from and forming part of this cap 29 is an arm 30 to whose outer end is connected the push rod 21. To accommodate variations in the length of the rod 21 the cap 29 and arm 30 may, before being connected, be lifted from the outer end of the pinion 22 and adjusted thereon to the required position, after which the cap 29 may be retained in place on the outer end of the valve stem by means of a screw 31.

Figure 10:
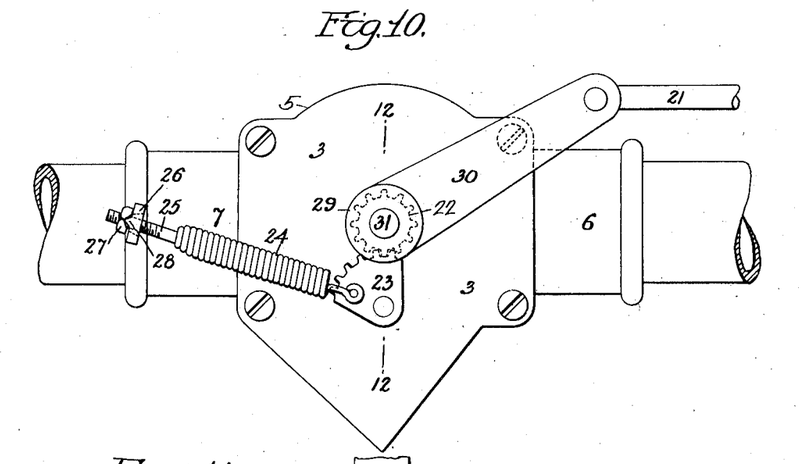
Fig. 10 is a side elevation of the muffler cut-out with its operating devices in the positions assumed when the valve is in the position shown in Fig. 1.

The action of the spring 24 at all times tends to hold the parts in the positions shown in Fig. 10, at which time the valve member is in the position shown in Fig. 1. When the arm 30 has been swung to the left through an angle of about 90° against the action of the spring 24, the valve member is moved to the position shown in Fig. 3. Were the arm 30 moved to a position midway between that shown in Figs. 10 and 11, the valve member is brought to the position shown in Fig. 2. Whenever the parts are in this intermediate position or in the position shown in Fig. 11, their release will permit them, through the pull of the spring 24, to again assume the position shown in Fig. 10, which is the one they will normally occupy and in which the exhaust gases are directed to the muffler.

Figures 11, 11A, 12:
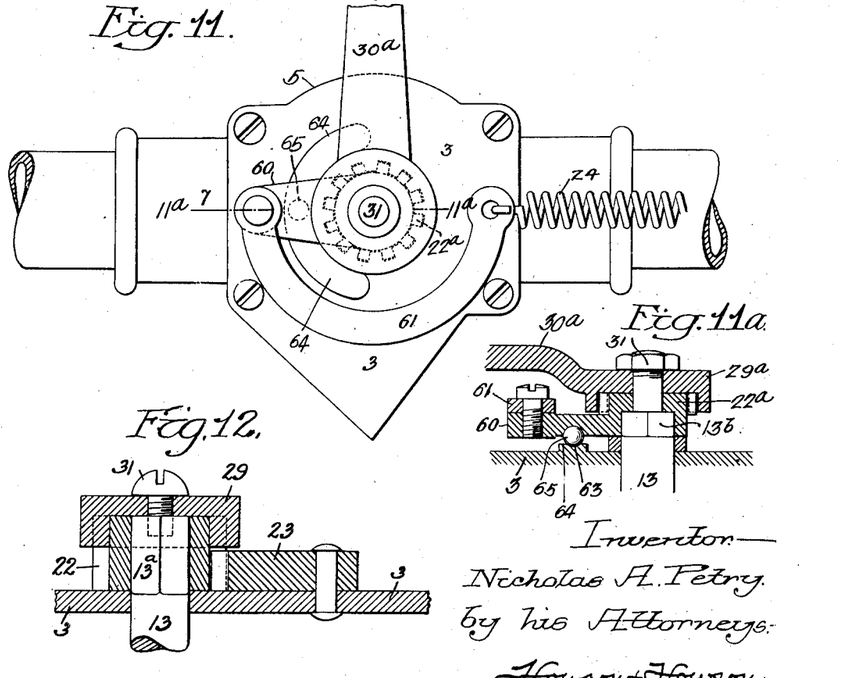

In that form of the invention shown in Fig. 11, I mount on the squared end of the valve spindle 13$^b$ an arm 60 whose outer end is connected through a semi-annular link with a spring 24 which is mounted and attached to the valve casing as described above. This arm 60 has connected to or formed integral with it a toothed structure or pinion 22$^a$ which is operatively connected to an operating arm 30$^a$ by an internally toothed cap 29$^a$. As will be understood by those skilled in the art, with such an arrangement of parts the spring 24 will act through the link 61 to tend to hold the arm 60 and hence the parts attached thereto on one or the other side of the mid position or "dead point" at which said parts are shown so that the valve member occupies and tends to remain either in the position shown in Fig. 1 or in that shown in Fig. 3. In order that it may also remain in the mid position shown in Fig. 12 with the attached parts as shown in Fig. 11, I provide a socket 63 on the valve casing with a circular track 64 on either side thereof and mount a ball or other retaining device 65 in a suitable recess in the under side of the arm 60 so that it may roll on the track and when brought into the socket, releasably hold the various parts in the intermediate position shown.

Figure 14:
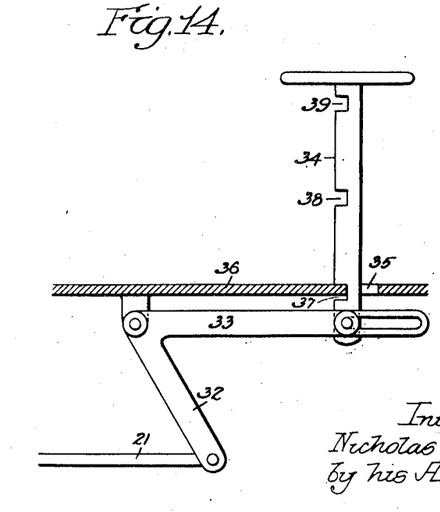
Fig. 14 is a vertical sectional view of the treadle adapted to operate the devices shown in Fig. 10.

In Fig. 14, I have shown a type of treadle adapted to operate the push rod 21 which has its forward end pivotally connected to one arm 32 of a bell crank lever, the other arm 33 of which is pivotally connected to the lower end of a treadle post 34. This post passes through a slot 35 in a plate 36 and is provided with three notches 37, 38 and 39, either of which may be caused to engage with the edge of the slot 35. With the treadle in the position shown in Fig. 14, the valve operating parts will be in the position shown in Fig. 10, and if it be depressed until the notch 39 engages the edge of the slot 35 the valve member will be in the position shown in Fig. 3. When the notch 38 engages the edge of the slot 35 the parts will be in mid position, so that when the treadle is in the position shown, the exhaust gases will be directed to the muffler, when the notch 38 engages the slot, the exhaust gases will be directed to the heater, and when the notch 39 engages the slot they will be directed to the cut-out.

Should it be desired to operate the valve through the medium of a pull rod rather than a push rod, it is merely necessary to so adjust the cap 29 and arm 30 upon the pinion 22 that they project downwardly instead of upwardly therefrom, the arm 30 being made sufficiently removed from the outer face of the plate 3 to clear the segment 23 and spring 24.

Figure 13:
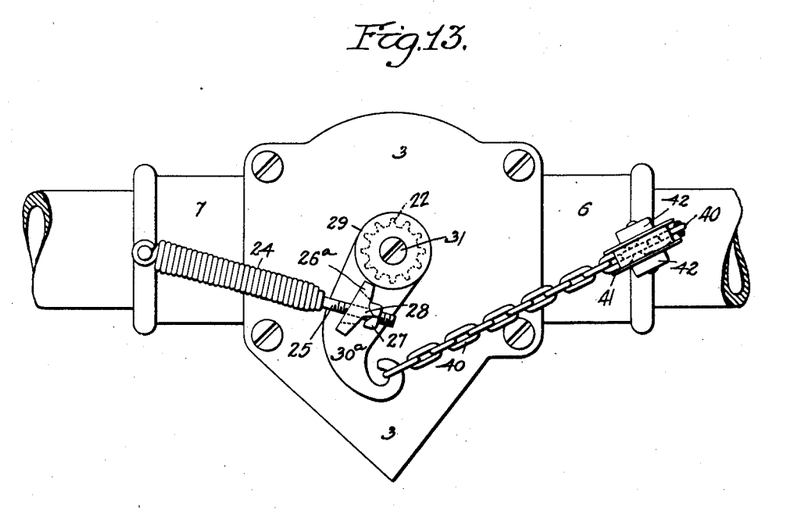
Fig. 13 is a view similar to Fig. 10, but showing the operating devices adapted to be actuated by a pull chain.

In Fig. 13, I have illustrated a form of operating mechanism by means of which the valve member may be operated through the medium of a pull chain or cable 40. In this case I attach the cable to the outer end of an arm 30$^a$ and have it pass over a pulley 41 mounted upon lugs 42 integral with and projecting from the outer end of the casing inclosing the inlet port 6. In this case, I reverse the spring 24, fastening one end of it to a pin or lug projecting from the outer end of a casing of the exhaust port 7 and have the screw stem 25 pass through an opening in a lug 26$^a$ formed upon the outer face of the arm 30ᵃ. This lug 26ᵃ is provided with the projections 28 which engage with the notches in the adjusting nut 27.

Figure 15:
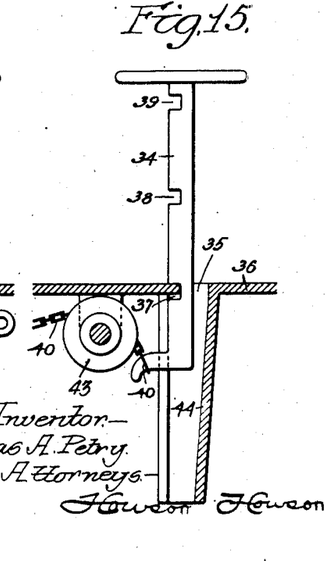
Fig. 15 is a view similar to Fig. 14, but showing a treadle adapted to operate the devices shown in Fig. 13.

The forward end of the chain or cable 40 may be attached to and operated by a bell crank lever or it may be attached to the lower end of the treadle post 34, as shown in Fig. 15, in which case the chain will pass over a pulley 43 and the treadle post be engaged and guided by a depending frame 44.

Figures 16, 17, 18, 19, 20, 21:
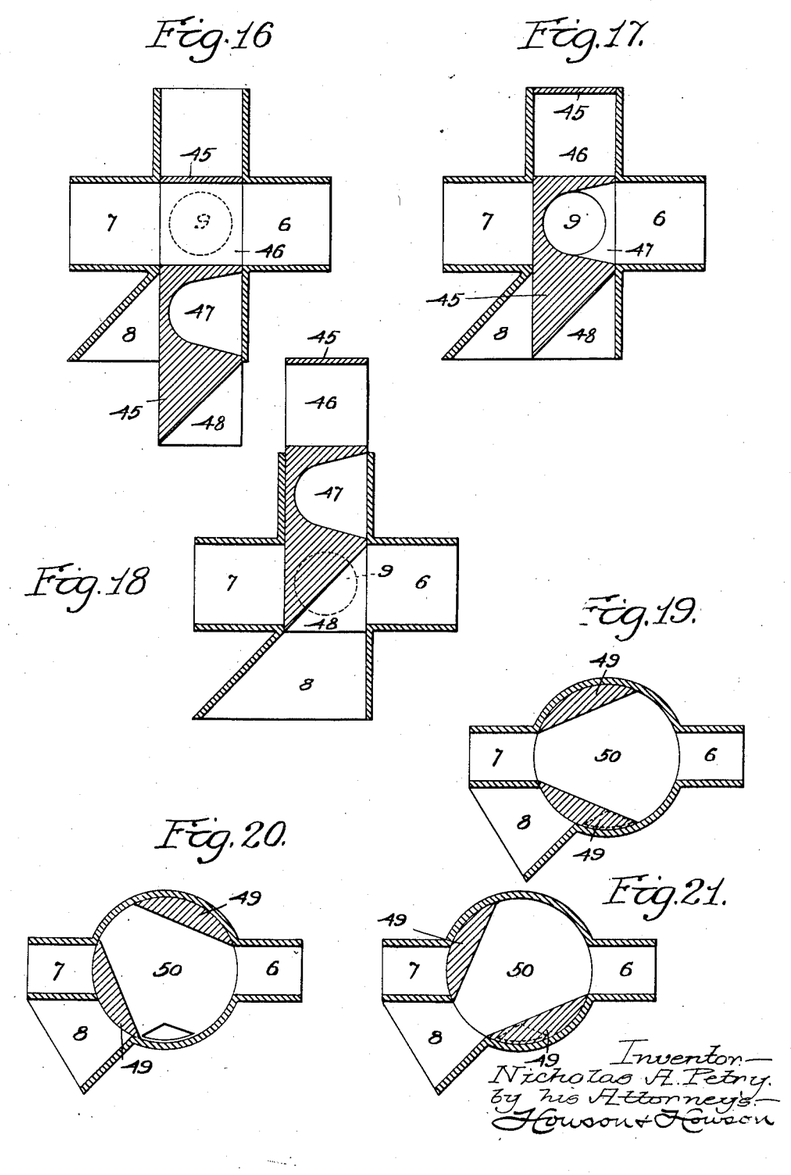
Figs. 16, 17 and 18 are vertical sectional views of a modified form of muffler cut-out embraced within the scope of my invention, in which I employ a sliding valve, these figures showing, respectively, the valve in position to direct the exhaust gases to the muffler, to the heater, and to the cut-out.
Figs. 19, 20 and 21 are similar and corresponding views of another modified form of my invention in which I employ a rotary plug valve.

In the modified form of my invention shown in Figs. 16 to 18, I employ a sliding valve 45 which may be operated by means of a rack and pinion or other suitable device, and which as shown in Fig. 16, is equipped with a through passage 46 to permit the exhaust gases to flow to the muffler, with a side opening passage 47 to divert the gases to the heater, as in Fig. 17, and with a downwardly opening passage 48 to direct the gases to the cut-out, as shown in Fig. 18.

In the modification shown in Figs. 19, 20 and 21, I employ a rotatable plug valve 49 through which is formed a passage 50, whose inlet end is wider than its outlet end, so that when said plug is rotated the inlet end will at all times be in communication with the inlet port 6 and an outlet end will be either in communication with the muffler exhaust port 7, as shown in Fig. 19, or with the heater exhaust port 9ᵃ which opens into one side of the casing, as shown in Fig. 20, or with the cut-out exhaust port 8, as shown in Fig. 21.

Although I have shown and described my invention as applied to a muffler cut-out for motor cars, I do not limit myself to this use, as it is obvious that said invention may, without material change, be adapted to control the flow of any kind of fluid.

I claim:—

1. A valve structure comprising a casing having a valve chamber in communication with which are an inlet port, a muffler exhaust port, and a muffler cut-out exhaust port all opening substantially in one plane, and a supplementary exhaust port opening at an angle to said plane; in combination with a valve member adjustable at will to direct flow of fluid from the inlet port to the muffler exhaust port, or to the muffler cut-out exhaust port, or to the supplementary exhaust port.

2. A valve structure comprising a casing having a valve chamber in communication with which are an inlet port, a muffler exhaust port, a muffler cut-out exhaust port arranged with their center lines all in one plane and a supplementary exhaust port extending in a line substantially at right angles to said plane; in combination with a valve member formed to permit constant entrance of fluid through the inlet port and adjustable at will to direct flow of such fluid to the muffler exhaust port, or to the muffler cut-out exhaust port, or to the supplementary exhaust port.

3. A muffler cut-out comprising a casing having a valve chamber in communication with which are peripherally arranged, inlet-, muffler exhaust-, and cut-out exhaust ports, together with a supplementary exhaust port opening into the casing at the side; in combination with an oscillatory valve member in the form of a boxlike body open at one side to communicate with the inlet port and open at the end to communicate with the supplementary exhaust port, said valve being adjustable at will to direct flow of gases from the inlet port to the muffler exhaust port, or to the cut-out exhaust port, or to the supplementary exhaust port.

4. A muffler cut-out comprising a casing having a valve chamber in communication with which are peripherally arranged inlet-, muffler exhaust-, and cut-out exhaust ports, together with a supplementary exhaust port opening into the casing at the side; in combination with an oscillatory valve member in the form of a boxlike body open at one side to communicate with the inlet port and open at the end to communicate with the supplementary exhaust port, with lateral wings adjacent the open end of the body in position to close the supplementary exhaust port in certain positions of the valve, said valve being adjustable at will to direct flow of gases from the inlet port to the muffler exhaust port, or to the cut-out exhaust port, or to the supplementary exhaust port.

5. A muffler cut-out comprising a casing having a valve chamber in communication with which are peripherally arranged, inlet-, muffler exhaust-, and cut-out ports, together with a side opening supplementary exhaust port, a radial partition in the casing between certain of said ports; with an oscillatory valve having side and end openings and placed to coöperate with the partition to establish communication between the inlet port and any one of said other ports at will.

6. A muffler cut-out comprising a casing having a valve chamber in communication with which are an inlet port, a muffler exhaust port, a cut-out exhaust port, and a supplementary exhaust port, in combination with a valve member having transverse and lateral wings, said valve member being adjustable at will to direct flow of gases from the inlet port to the muffler exhaust port, or to the cut-out exhaust port, or to the supplementary exhaust port.

7. A muffler cut-out comprising a casing having a valve chamber in communication with which are an inlet port, a muffler exhaust port, a cut-out exhaust port and a supplementary exhaust port, in combination with a valve member having transverse and lateral wings, said valve member being formed to permit constant entrance of gases through the inlet port and being adjustable at will to direct the flow of such gases to the muffler exhaust port, or to the cut-out exhaust port, or to the supplementary exhaust port.

8. A muffler cut-out comprising a casing having a valve chamber in communication with which are an inlet port, a muffler exhaust port, a cut-out exhaust port and a supplementary exhaust port, in combination with a valve member having transverse and lateral wings, said valve member being adjustable to direct flow of gases from the inlet port to the muffler exhaust port, or to the cut-out exhaust port, or to the supplementary exhaust port, there being formed in said valve member between the transverse wings of the same a pocket which is in line with the inlet port when the gases are being directed to the supplementary exhaust port.

9. A muffler cut-out comprising a casing having an inlet port, a muffler exhaust port, and a cut-out exhaust port, in combination with a removably mounted transverse partition extending into the chamber formed within the casing, and a valve member mounted within the casing at the inner end of said transverse partition.

10. A muffler cut-out comprising a casing having an inlet port, a muffler exhaust port, and a cut-out exhaust port, in combination with a side plate removably attached to said casing; a removably mounted transverse partition extending into the chamber formed within the casing; and a valve member mounted within the casing at the inner end of the transverse partition.

11. A muffler cut-out comprising a casing having an inlet port, a muffler exhaust port, and a cut-out exhaust port, in combination with side plates removably attached to said casing; a removably mounted transverse partition extending into the chamber formed within the casing; and a valve member mounted within the casing at the inner end of the transverse partition.

12. A muffler cut-out comprising a casing having an inlet port, a muffler exhaust port, a laterally opening supplementary exhaust port, and a cut-out exhaust port; in combination with a transverse partition extending diagonally into the chamber formed within the casing; and a valve member mounted within the casing at the inner end of the transverse partition, in position to establish communication between the inlet and any of the other ports at will.

13. A muffler cut-out comprising a casing having an inlet port, a muffler exhaust port, and a cut-out exhaust port, and including side plates of which one is provided with a supplementary exhaust port; a transverse partition extending into the chamber formed within the casing, with a valve member mounted within the casing at the inner end of the transverse partition and adjustable at will to establish communication between the inlet port and any of the other ports at will.

14. A muffler cut-out comprising a casing having an inlet port, a muffler exhaust port, and a cut-out exhaust port; in combination with a side plate removably attached to said casing and provided with a supplementary exhaust port; a removably mounted transverse partition extending diagonally into the casing; and a valve member mounted within the casing and pivoted at the inner end of the transverse partition, with means for adjusting said valve member into positions to establish communication between said inlet port and any of said other ports at will.

15. A muffler cut-out comprising a casing having peripherally arranged inlet-, muffler exhaust-, and cut-out exhaust ports and a side supplementary exhaust port; a transverse partition in the casing; with an oscillatory valve pivoted at the inner end of said partition, having a side and a peripheral opening, and adjustable at will to establish communication between the inlet port and any of said other ports.

16. A muffler cut-out comprising a casing having an inlet port, a muffler exhaust port, and a cut-out exhaust port, in combination with a removably mounted transverse partition extending into the chamber formed within the casing; and a valve member mounted in the casing at the inner end of the transverse partition.

17. A muffler cut-out comprising a casing having an inlet port, a muffler exhaust port, and a cut-out exhaust port, in combination with a removably mounted transverse partition extending into the chamber formed within the casing; and a valve member mounted in the casing at the inner end of the transverse partition, said casing including a removable side plate retaining said partition in place.

18. A muffler cut-out comprising a casing having an inlet port, a muffler exhaust port and a cut-out port, and being provided with a removable side plate, there being grooves in said casing of which one is formed in said plate; a transverse partition removably extending into said grooves; and a valve member mounted in the casing at the inner end of said partition and adjustable to direct fluid from the inlet port to either of the other ports.

19. A muffler cut-out comprising a casing having inlet-, muffler exhaust-, cut-out exhaust-, and supplementary exhaust ports and provided with at least one removable side plate, there being grooves in said casing of which one is formed in the side plate; a transverse partition removably extending into said grooves within the casing; and a valve member in the casing mounted adjacent one end of the partition.

20. A muffler cut-out consisting of a substantially cylindrical casing having an inlet port, a muffler exhaust port and a cut-out exhaust port opening into it through its cylindrical wall, together with a supplementary exhaust port opening into the casing in the side thereof; with a valve in said casing adjustable to place said inlet port in communication with any of the other ports at will.

21. The combination in a muffler cut-out of a casing having an inlet port, a muffler exhaust port, a laterally opening supplementary exhaust port, and a cut-out exhaust port, and including a partition extending from its wall inwardly toward its center; with an oscillatory valve mounted to turn on an axis extending adjacent the inner end of said partition and adjustable to establish communication between the inlet port and any of the other ports.

22. The combination in a muffler cut-out of a casing having an inlet port, a muffler exhaust port and a cut-out exhaust port, and including a removable partition extending from its wall inwardly toward its center; with an oscillatory valve mounted to turn on an axis extending adjacent the inner end of said partition and adjustable to establish communication between the inlet port and any of the other ports.

23. The combination in a muffler cut-out of a casing having an inlet port, a muffler exhaust port and a cut-out exhaust port; a partition removably mounted in said casing between the muffler exhaust port and the cut-out exhaust port; and an oscillatory valve pivotally mounted adjacent one end of the partition in position to coöperate therewith to direct fluid from the inlet port either to the muffler exhaust port or to the cut-out exhaust port at will.

24. The combination in a muffler cut-out of a casing having an inlet port, a muffler exhaust port, a cut-out exhaust port and at least one supplementary exhaust port; with a valve member mounted in said casing including transverse wings provided with lateral extensions and adjustable to establish communication between the inlet port and any of the other ports, said supplementary exhaust port opening into said valve member through the space between the lateral extensions when the member has been brought to a predetermined position.

25. A muffler cut-out comprising a casing having inlet-, muffler exhaust-, and cut-out exhaust ports and including a radially extending partition between two of said ports; with an oscillatory valve mounted to swing on an axis running adjacent one end of the partition and including two transverse wings spaced apart in position to coöperate with the partition to direct fluid from the inlet port to either of the other ports at will, there being a supplementary exhaust port for the casing placed to open into the space between said transverse wings in one position of the valve.

26. A muffler cut-out comprising a casing having inlet-, muffler exhaust-, and cut-out exhaust ports and including a radially extending partition between two of said ports; with an oscillatory valve mounted to swing on an axis running adjacent one end of the partition and including two transverse wings spaced apart in position to coöperate with the partition to direct fluid from the inlet port to either of the other ports at will, there being a supplementary exhaust port for the casing placed to open into the space between said transverse wings in one position of the valve, said valve including lateral extensions for said wings placed to cover said supplementary opening in other positions of the valve.

27. The combination of a casing having a cylindrical cavity provided with inlet-, muffler exhaust-, and cut-out exhaust ports opening into it through its cylindrical surface, together with at least one supplementary exhaust port opening into said cavity at one side thereof; a radial partition in the casing; an oscillatory valve pivoted on a spindle adjacent one end of the partition and consisting of two radially extending blades at an angle to each other; with lateral extensions projecting in opposite direction from the edges of said blades respectively, said valve being adjustable to establish communication between the inlet port and any of the other ports.

28. A muffler cut-out consisting of a casing having peripherally arranged inlet-, muffler exhaust-, and cut-out exhaust ports, with supplementary exhaust ports in the sides of the casing; and a valve adjustable within the casing to establish communication between the inlet port and any of the other ports at will.

29. A muffler cut-out consisting of a casing having a series of peripherally arranged ports and also having at least one side port; with a valve in the casing adjustable to establish communication between one of the peripheral ports and any of the other ports at will, said valve including a portion slidable over the side port or ports in position to be forced toward the same by fluid under pressure in the casing.

In witness whereof I affix my signature.

NICHOLAS A. PETRY.